Figures 5, 6:
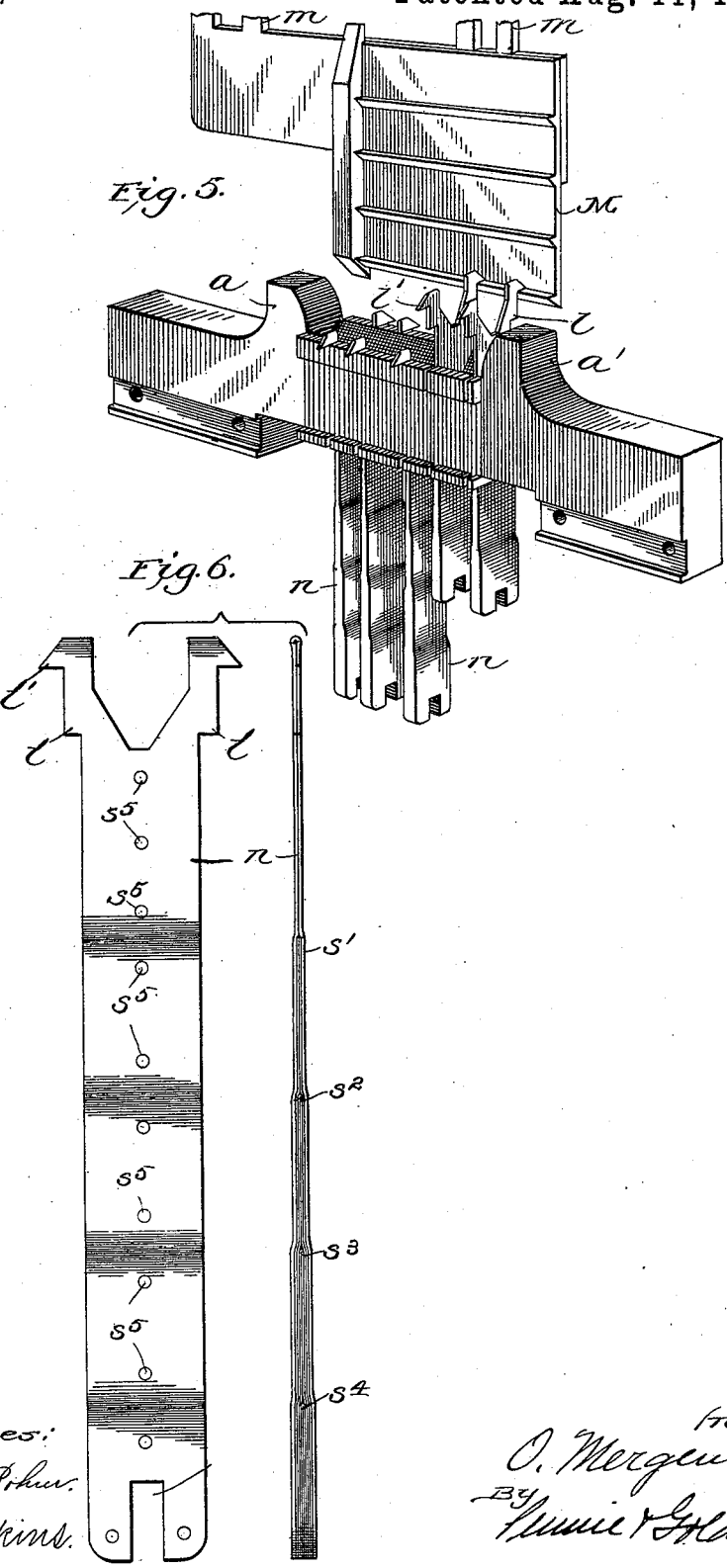

(No Model.)
13 Sheets—Sheet 1.
O. MERGENTHALER.
LINOTYPE MACHINE.
No. 565,490.
Patented Aug. 11, 1896.
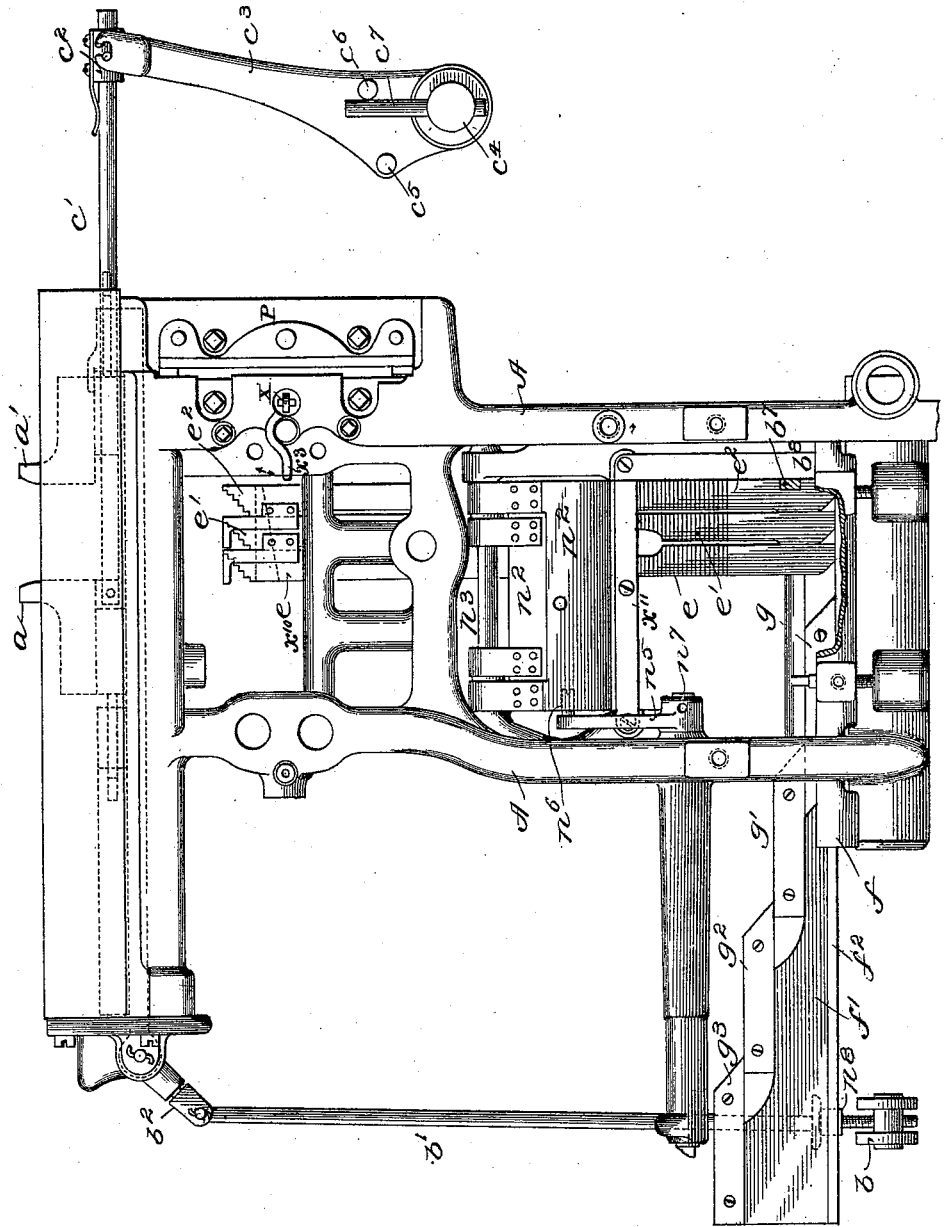
Witnesses:
Harry T. Rohrer.
A. W. Parkins.
Inventor:
O. Mergenthaler,
By Fennie & Goldsborough,
Attys.

(No Model.) 13 Sheets—Sheet 2.
O. MERGENTHALER.
LINOTYPE MACHINE.
No. 565,490. Patented Aug. 11, 1896.
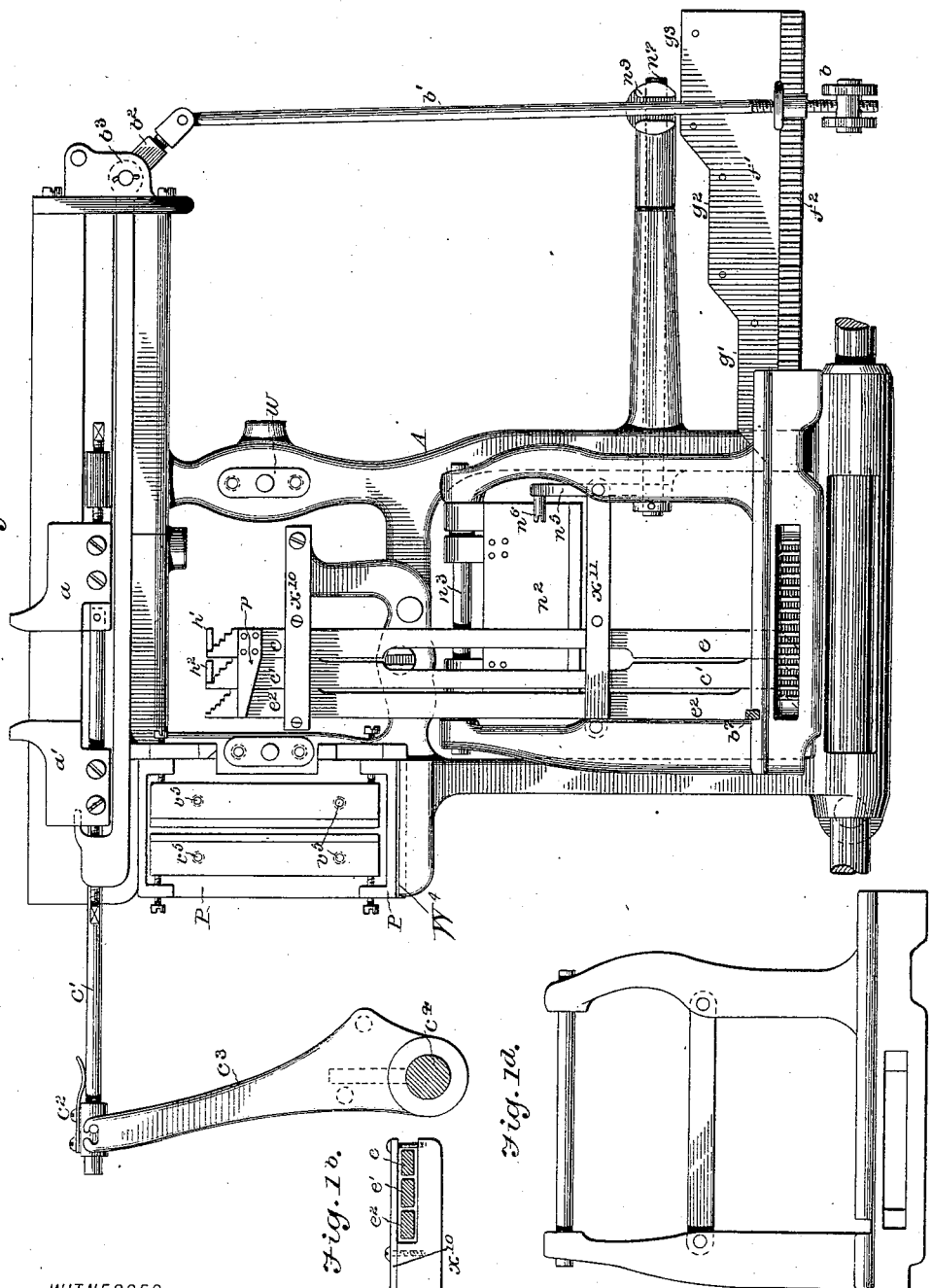
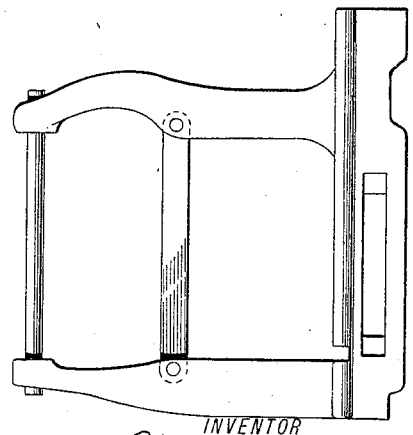
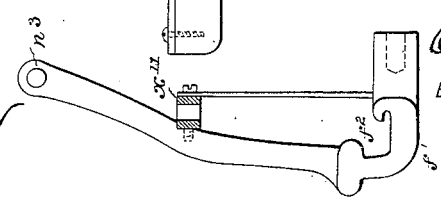
WITNESSES:
Arthur Ashley
G. S. Elmore
INVENTOR
Ottmar Mergenthaler
BY
Phil. T. Dodge
ATTORNEY.

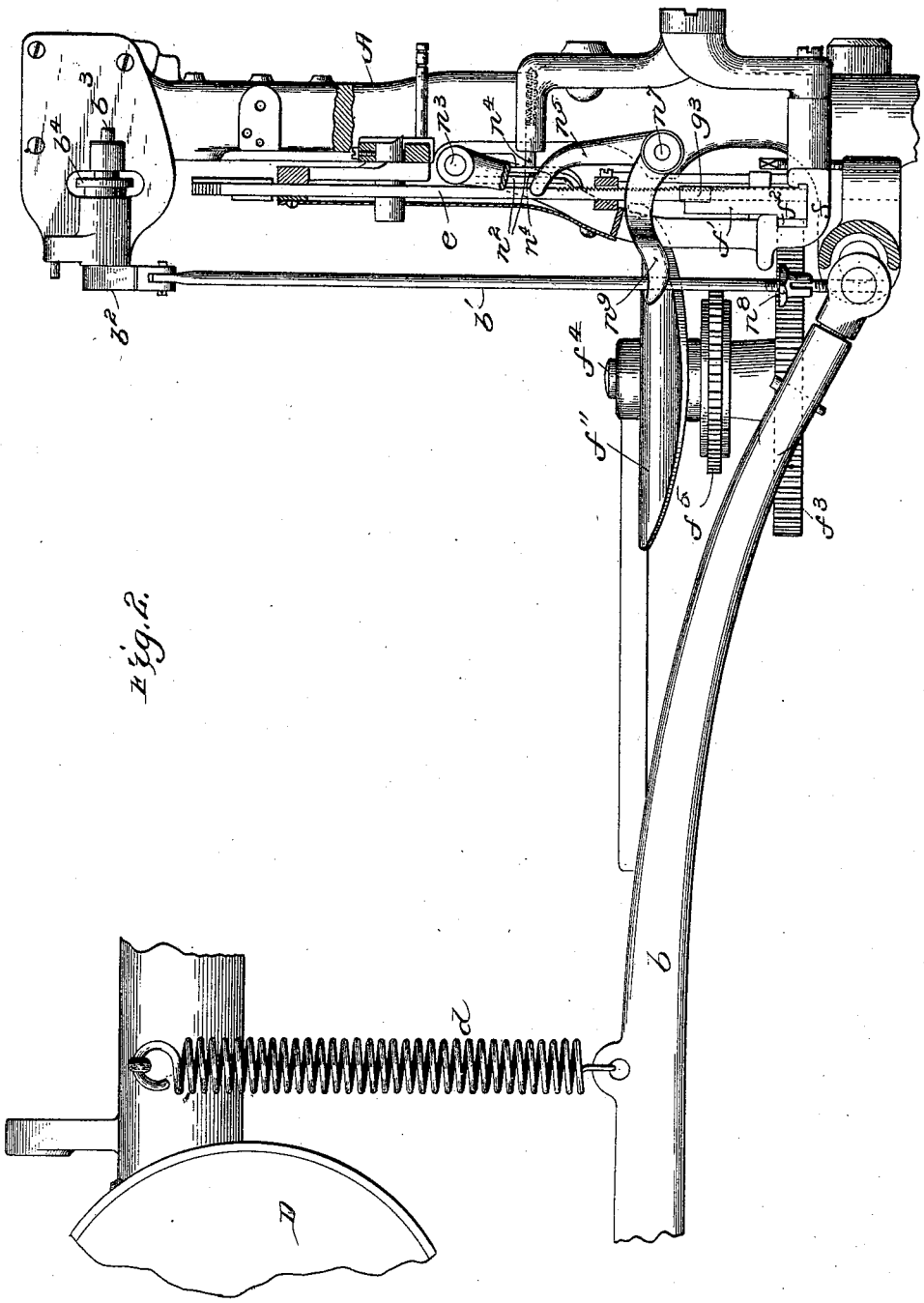

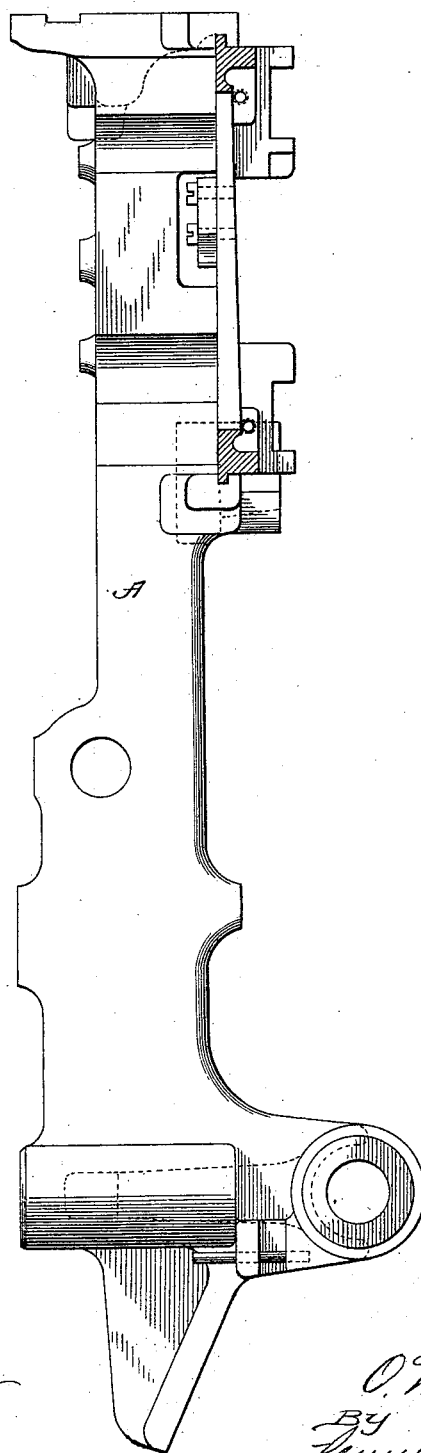

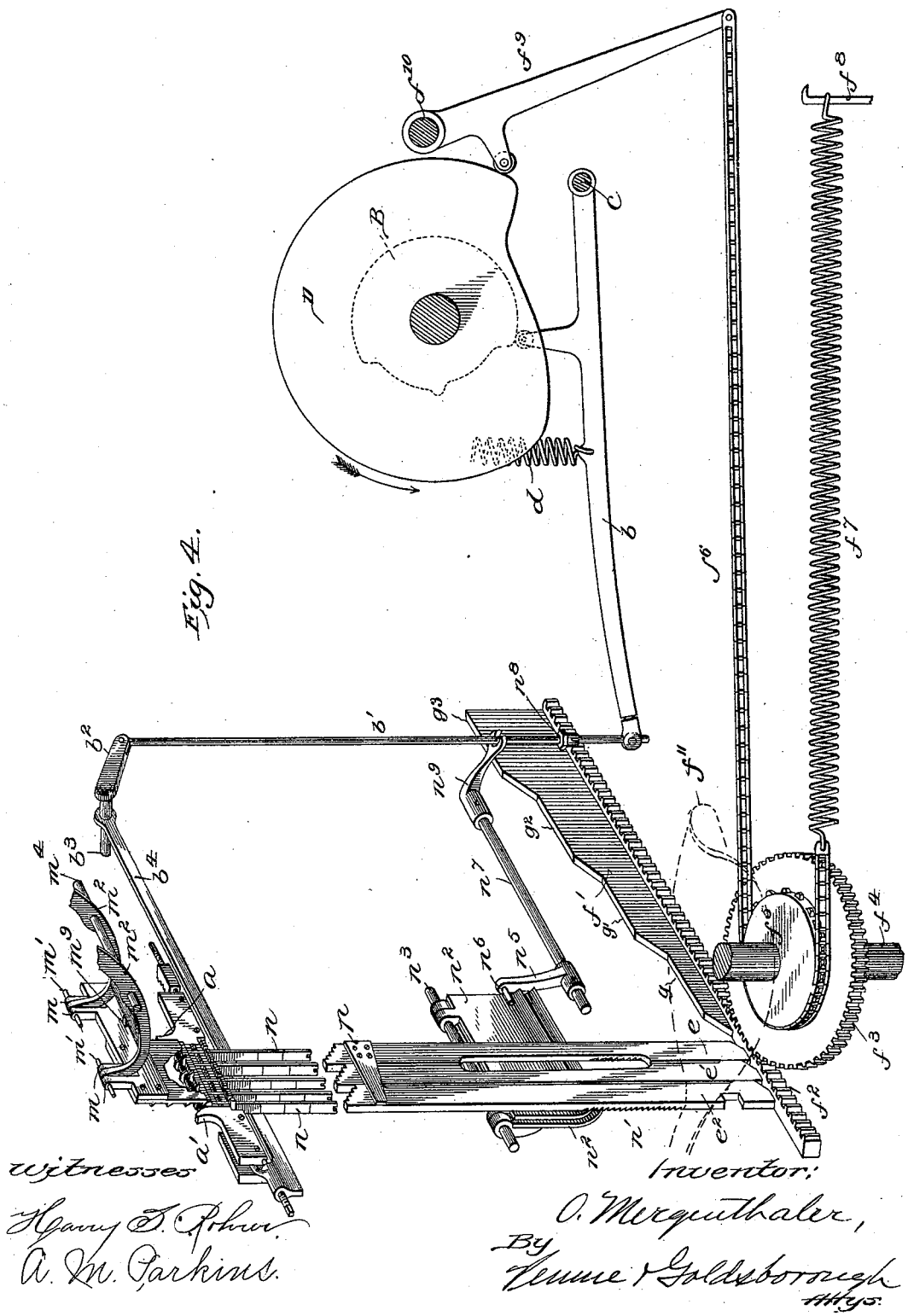

(No Model.) 13 Sheets—Sheet 6.

O. MERGENTHALER.
LINOTYPE MACHINE.

No. 565,490. Patented Aug. 11, 1896.

Witnesses:
Harry B. Rohrer.
A. M. Parkins.

Inventor:
O. Mergenthaler
By Pennie & Goldsborough
Attys (No Model.)  13 Sheets—Sheet 7.
O. MERGENTHALER.
LINOTYPE MACHINE.
No. 565,490.  Patented Aug. 11, 1896.
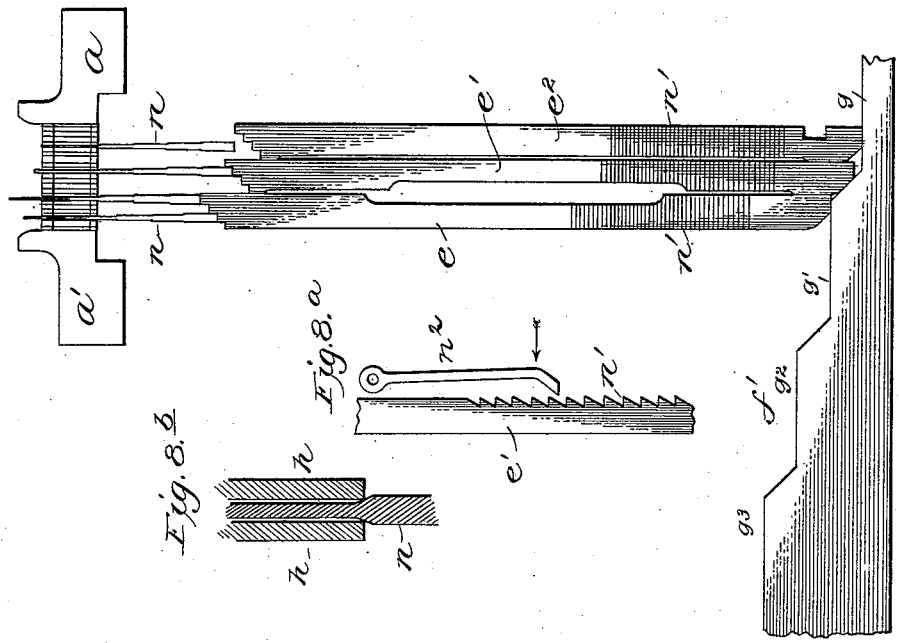
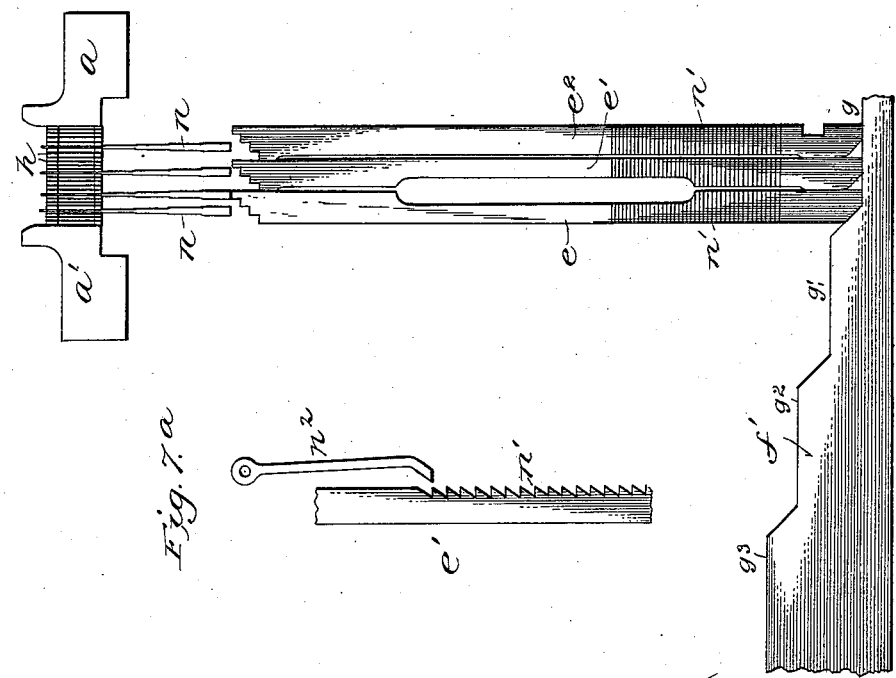
Witnesses:
Harry T. Rohrer
A. M. Parkins
Inventor:
O. Mergenthaler,
By
Fennie & Goldsborough
Attys.

(No Model.)  13 Sheets—Sheet 8.
O. MERGENTHALER.
LINOTYPE MACHINE.
No. 565,490. Patented Aug. 11, 1896.
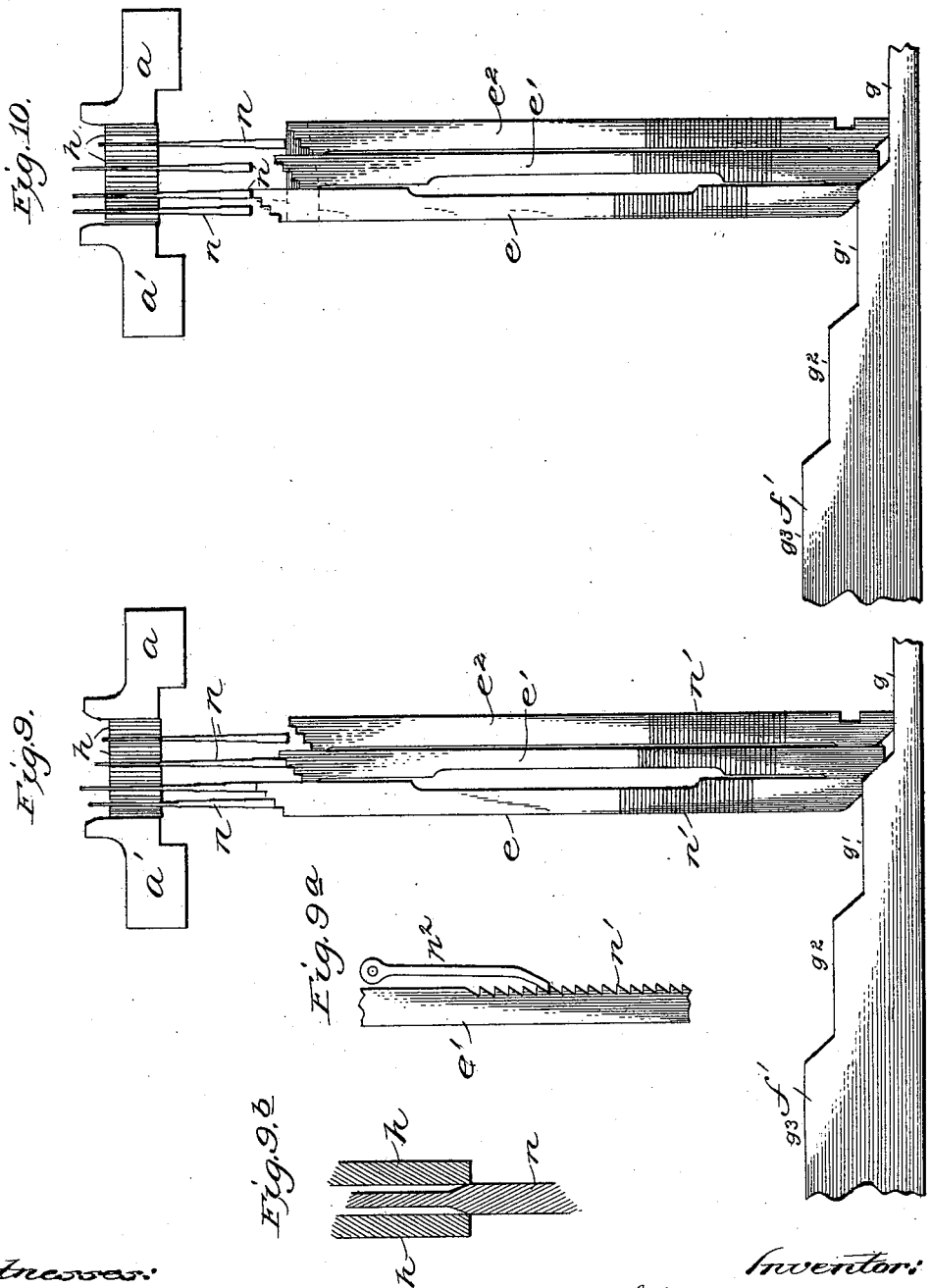

(No Model.)  
13 Sheets—Sheet 9.
O. MERGENTHALER.
LINOTYPE MACHINE.
No. 565,490.  Patented Aug. 11, 1896.
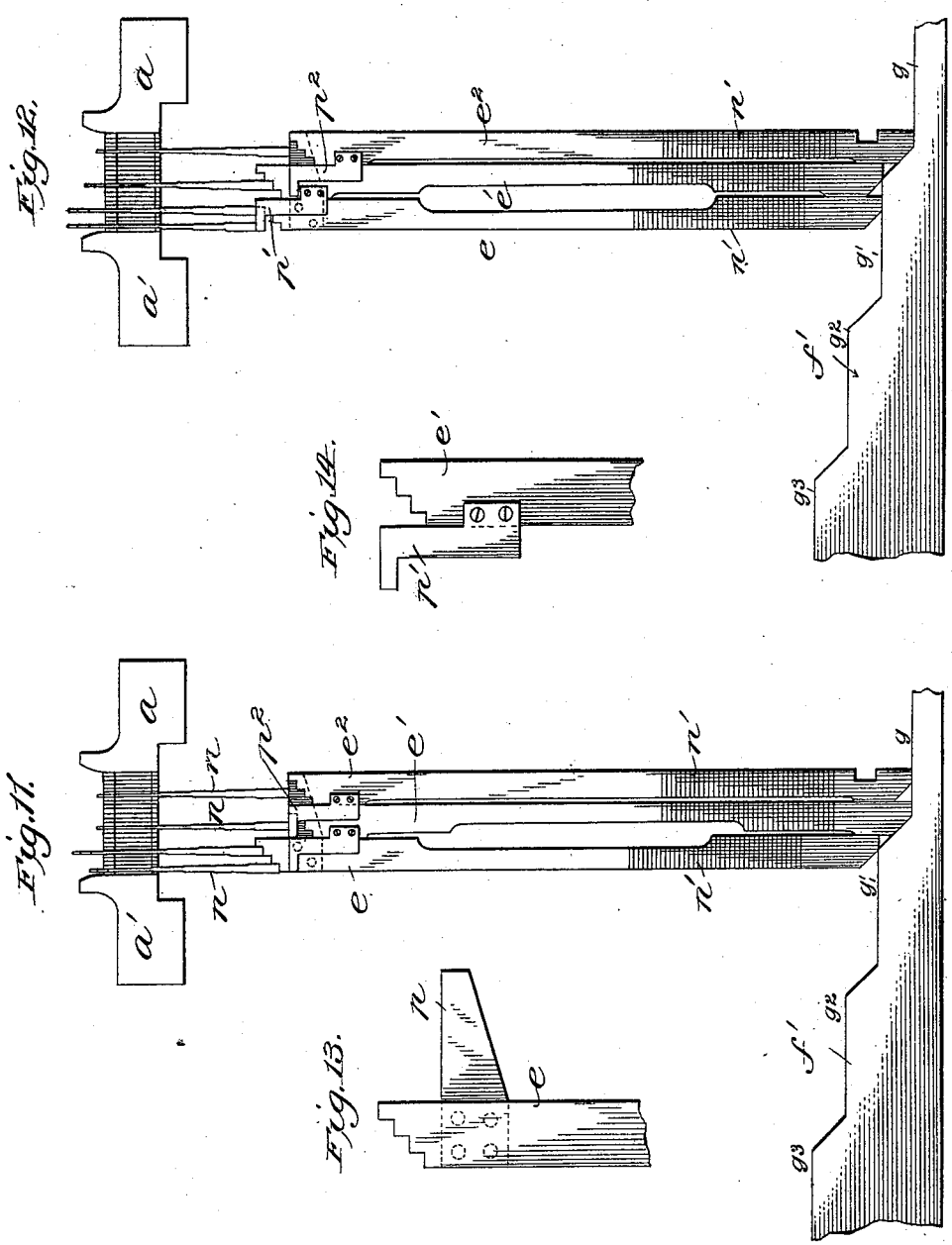

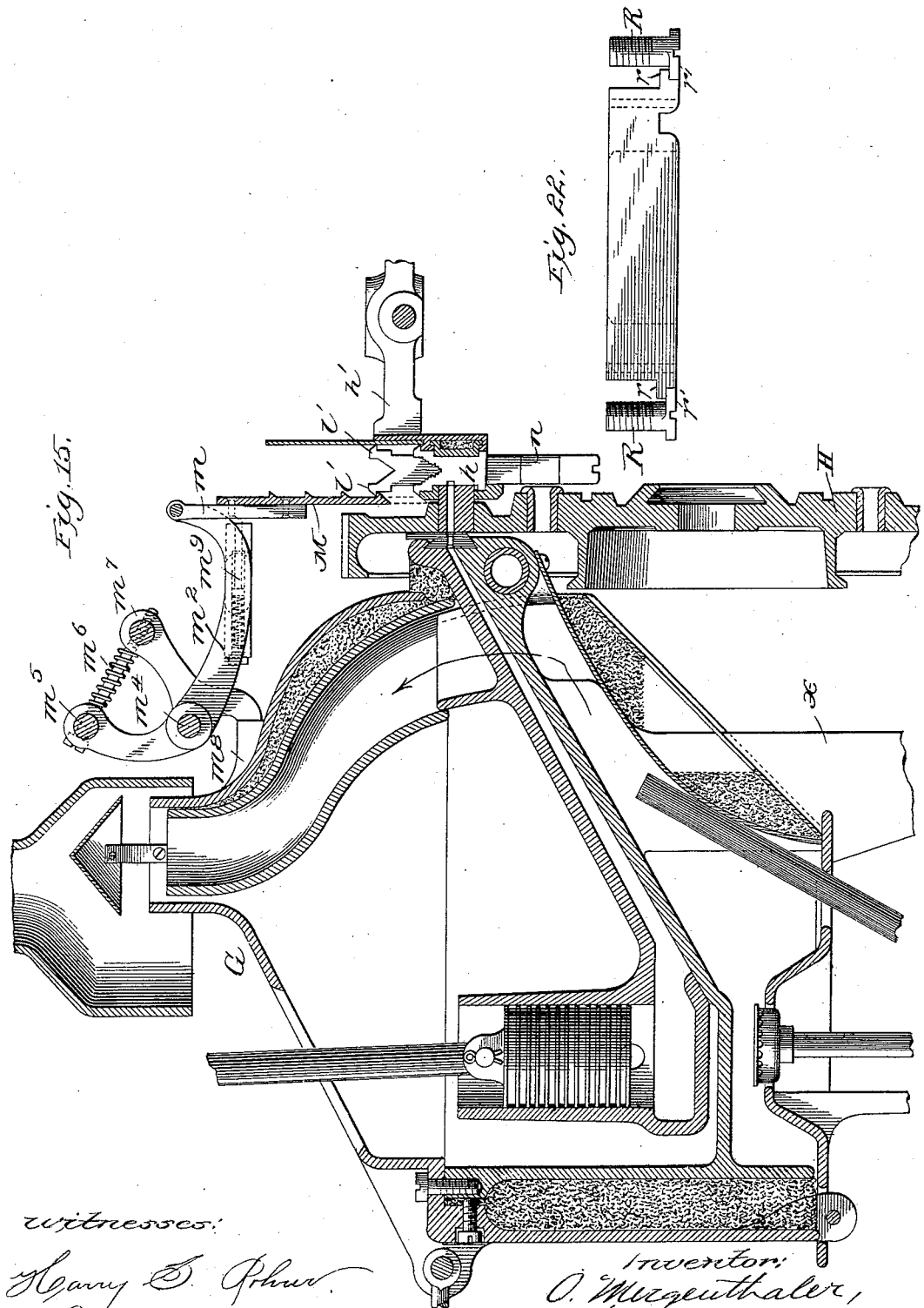

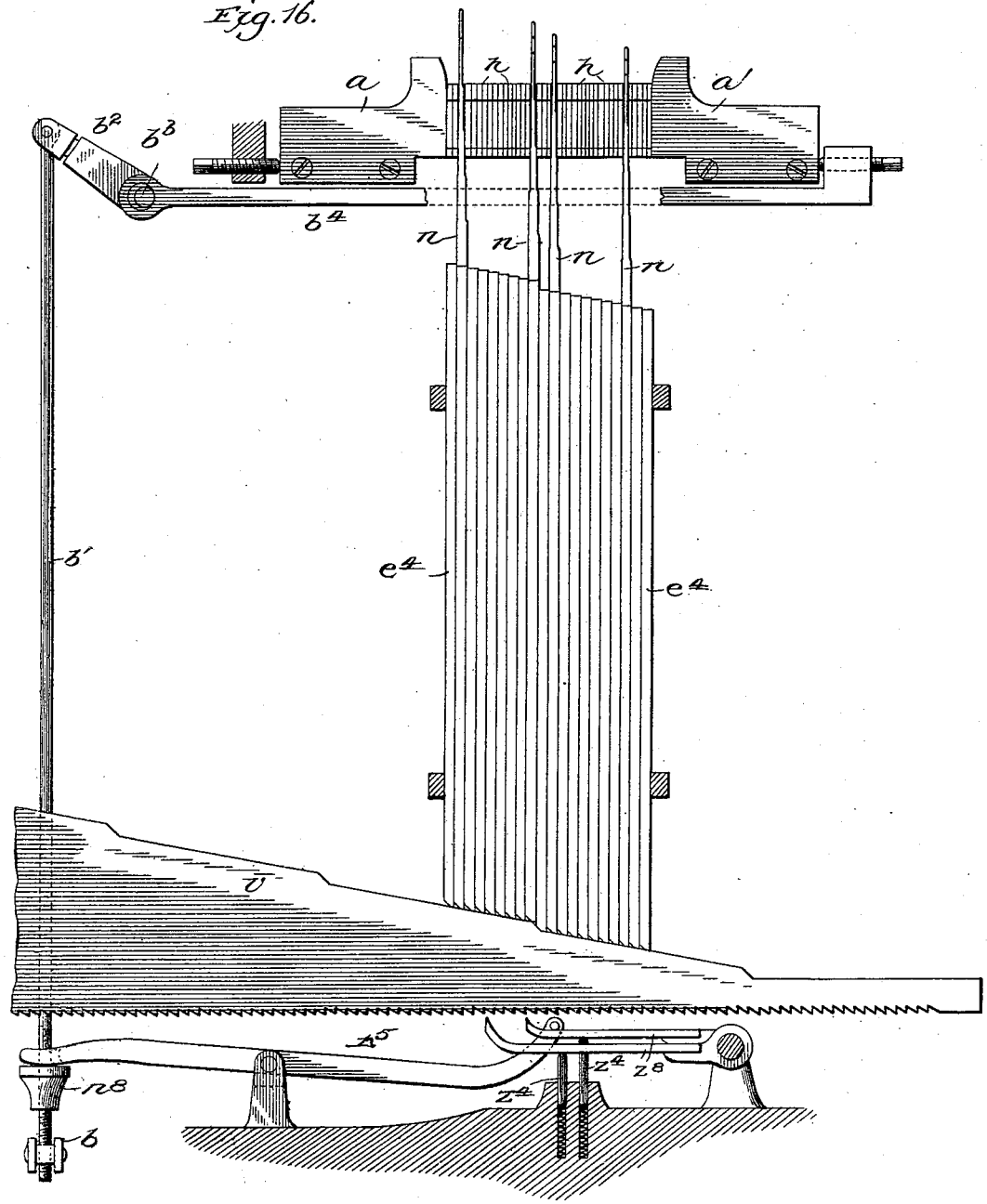

(No Model.) 13 Sheets—Sheet 12.

O. MERGENTHALER.
LINOTYPE MACHINE.

No. 565,490. Patented Aug. 11, 1896.

(No Model.)

O. MERGENTHALER.
LINOTYPE MACHINE.

No. 565,490.

13 Sheets—Sheet 13.

Patented Aug. 11, 1896.

WITNESSES:
Arthur Ashley
L. M. Lamb

INVENTOR
O. Mergenthaler
BY P. T. Dodge
ATTORNEY.

THE NORRIS PETERS CO., PHOTO-LITHO., WASHINGTON, D. C.

UNITED STATES PATENT OFFICE.

OTTMAR MERGENTHALER, OF BALTIMORE, MARYLAND, ASSIGNOR TO THE MERGENTHALER LINOTYPE COMPANY, OF NEW YORK, N. Y.

LINOTYPE-MACHINE.

SPECIFICATION forming part of Letters Patent No. 565,490, dated August 11, 1896.

Application filed July 20, 1894. Serial No. 518,414. (No model.)

*To all whom it may concern:*

Be it known that I, OTTMAR MERGENTHALER, a citizen of the United States, residing at Baltimore, in the State of Maryland, have invented certain new and useful Improvements in Linotype-Machines; and I do hereby declare the following to be a full, clear, and exact description of the invention, such as will enable others skilled in the art to which it appertains to make and use the same.

My invention relates to certain new and useful improvements in linotype-machines and machines of like character, wherein a metal slug or linotype is adapted to be cast in a mold against a composed line of type-matrices and space-bars presented momentarily against and closing one side of the mold, as in the well-known Mergenthaler linotype-machine.

The improvements relate particularly to means for spacing out or justifying the composed line to the suitable or desired length prior to the casting operation, and also to certain novel features in the construction and arrangement of parts of the mold-disk and their relation to the knife-block, so that in shifting from one font to another the new slug or linotype will, when the disk containing two molds of different sizes is rotated to bring one or the other into action, be brought into the proper alinement with the new planing-knives.

In an application for Letters Patent of the United States filed by me July 24, 1893, Serial No. 481,339, the composed line is, as usual, made up of the customary type-matrices or dies and of the space-bars inserted during the composition; but the space-bars are formed in such manner as to present a series of steps, the sides of each step being substantially parallel, the uppermost step of the space-bar being the thinnest and forming part of the composed line before justification, and the lower steps successively increasing in thickness by a determined amount, so that the introduction of these thicker steps into the line can be utilized to effect its justification. As each line is composed it is set or made up to as near its final length as possible, but there will always remain at the end of the line a space insufficient to admit another word or syllable, and which requires to be filled up by justification. This space differs with different lines and cannot practically be ascertained in advance. It is obvious that if all of the step-spaces of the line are advanced simultaneously the line will be elongated a definite and invariable distance; but in practice it is frequently found that the space remaining to be filled is insufficient to permit the advance of all the spaces, and it therefore becomes necessary to advance one or more of the spaces into the line to a greater distance than the others, thus introducing into the line toward the completion of justification the amount represented by the introduction of one step on one, two, or more spaces.

The present invention contemplates a mode of justification by means of the elongated stepped spaces, said mode of justification having as a characteristic feature the advance of one justifying step at a time into the line. To this end the space-bars are lifted one by one during the justifying action, so as to successively introduce additional single steps into the line until no more can be introduced, when the justifying operation temporarily ceases. At this stage of the operation there usually remains, after the line has thus been approximately closed out, a space insufficient for the admission of an additional step, but into which an additional step has partly entered. It is one of the objects of the invention to complete the justification by admitting this additional partly-entered step. When the additional partly-entered step is to be fully admitted into the line, (which is the particular construction illustrated in the drawings,) the further upward movement of the wholly-admitted steps of the remaining space-bars is temporarily arrested, and the vise-jaws containing the composed and partly-justified line are opened and the partly-entered space-step is advanced until it enters the line, whereupon it is in turn arrested. It is of course evident that at this stage of the operation, after the admission of the last step, the length of the line will depend upon the thickness of the additional fraction of a step which has been thus forced into it. For this reason successive lines will not be of uniform length, but will vary a certain fraction of the difference between the thickness of successive steps of the space-bar; that is, for instance, if the difference between the thicknesses of successive steps of a space-bar is .015 of an inch, the variations in the length of different lines after the admission of the last partly-admitted step would be between 0 and .015. If the steps were relatively thicker or thinner, the limit of variation in the length of the lines would be correspondingly increased or diminished. This difficulty, however, is in practice substantially obviated by making available the elasticity of the line due to the joints between the matrices and between the matrices and space-bars, and partly to the jointed construction of the space-bars themselves, if laminated spaces are used, whereby it is permitted either to compress the line to an amount equal to the excess of its length beyond the normal length, or to close the line very tightly by the action of the devices which force the spaces into the line, and on the final closing of the vise to leave the distance between the vise-jaws equal to the normal length of the uniform line and slightly longer than the particular line then undergoing justification, whereupon the elasticity of the line will come into play, all of the joints slightly opening, and yet none of them opening far enough to allow metal to pass in between the joints.

In the practical embodiment of the invention the shoving devices which act to introduce successively single justifying-steps into the composed line are themselves of a stepped construction, in the sense that they consist of bars having a series of steps on their edges, each of said steps being of equal or narrower width than the thickness of the lower edge of the space-bars, which makes it impossible for any one step of a shoving device to insert into the line more than one space-bar at a time. Furthermore, the length of each step on the space-bars is equal to the height of the highest step on the shoving device above the base-line of the lowest step thereon, which is also necessary in order to prevent two space-steps being entered into the composed line at the same time, as will hereinafter more fully appear.

It will of course be apparent that because the individual steps on the shoving devices are of less height than the length of the individual space-steps only the highest step of a shoving device could of itself raise a space-step to the final position in the justified line. Where, therefore, the steps only of the shoving devices are employed for advancing the space-bars, which is among the modifications herein illustrated, the completion of the operation of carrying upward to their final positions the space-steps entered into the line by the shoving devices is left wholly to the care of an auxiliary device called an "executor," whose function it is to thus supplement the action of the shoving devices after the latter have been arrested in their upward movement. There are, however, practical reasons why the executor should not be relied on to complete the admission of all of the space-steps. Among these reasons are the avoidance of unnecessary friction and resistance due to the variable size of the space or opening into which the last step must be entered. To obviate or minimize this disadvantage, the preferred construction involves dividing the shoving device into a number of consecutively-acting shoving devices, the construction and arrangement of parts being such that such space-steps as have been entered by the first shoving device are advanced to their final positions in the line by the next succeeding shoving device, and so on. This expedient leaves but very few of the space-bars to be acted upon by the executor, as the main portion of them have already been brought to their final positions before the executor comes into play.

Figure 17:
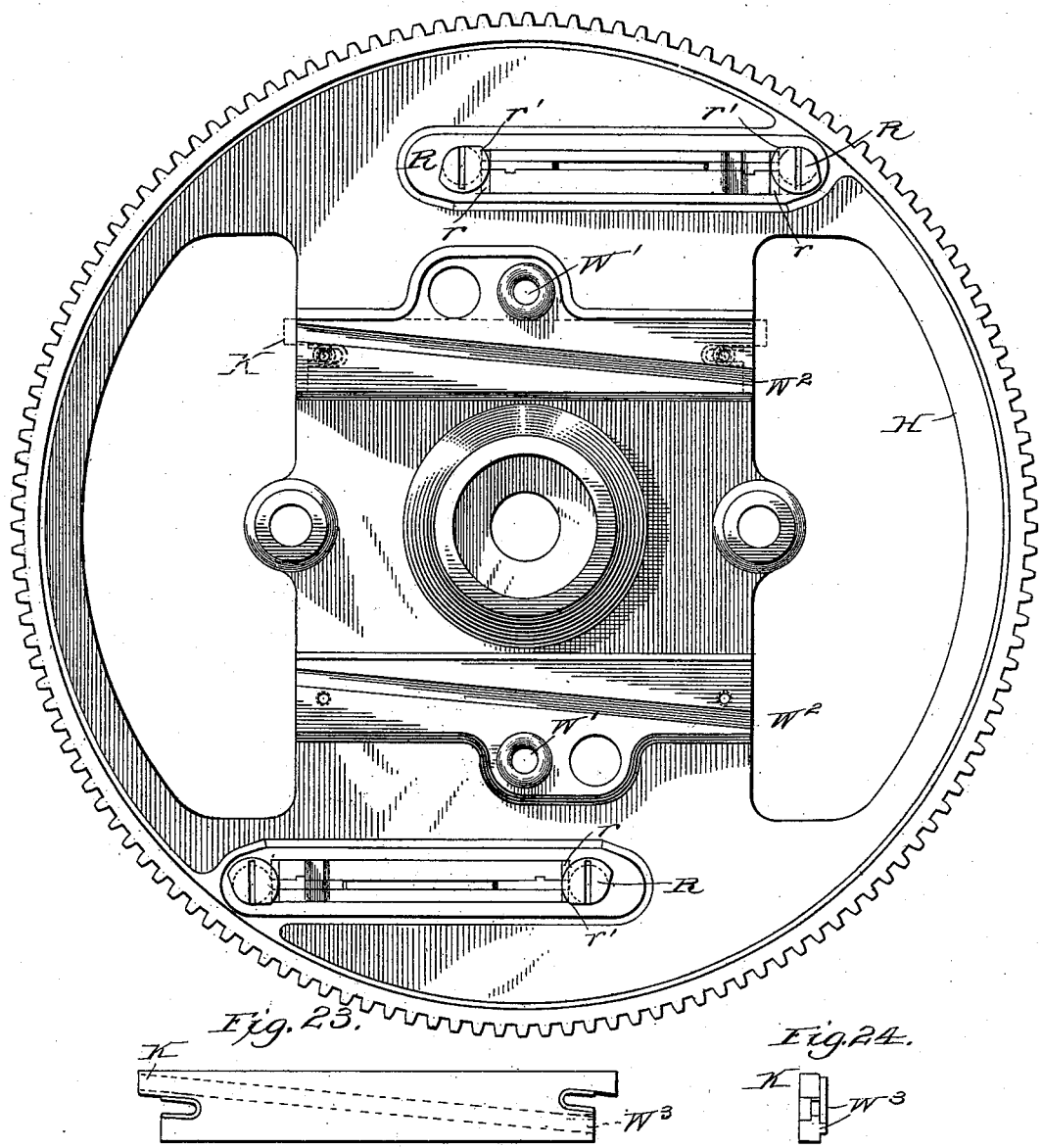
Figure 23:
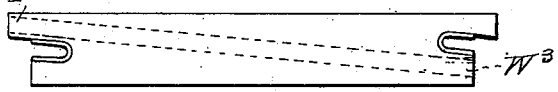
Figure 24:
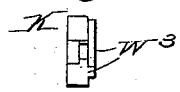
Figure 21:
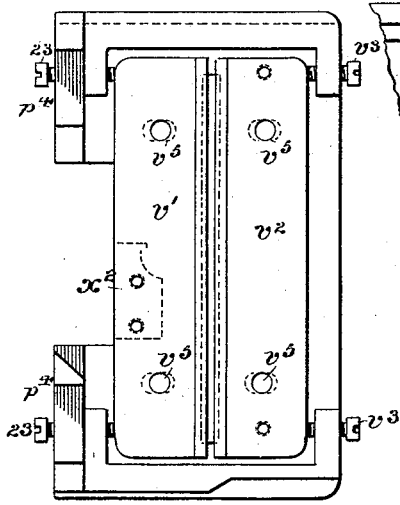
Figure 19:
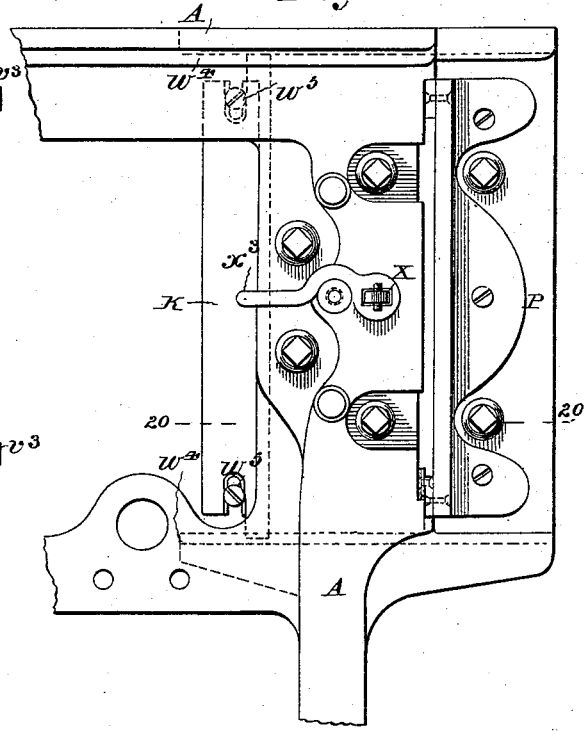
Figure 18:
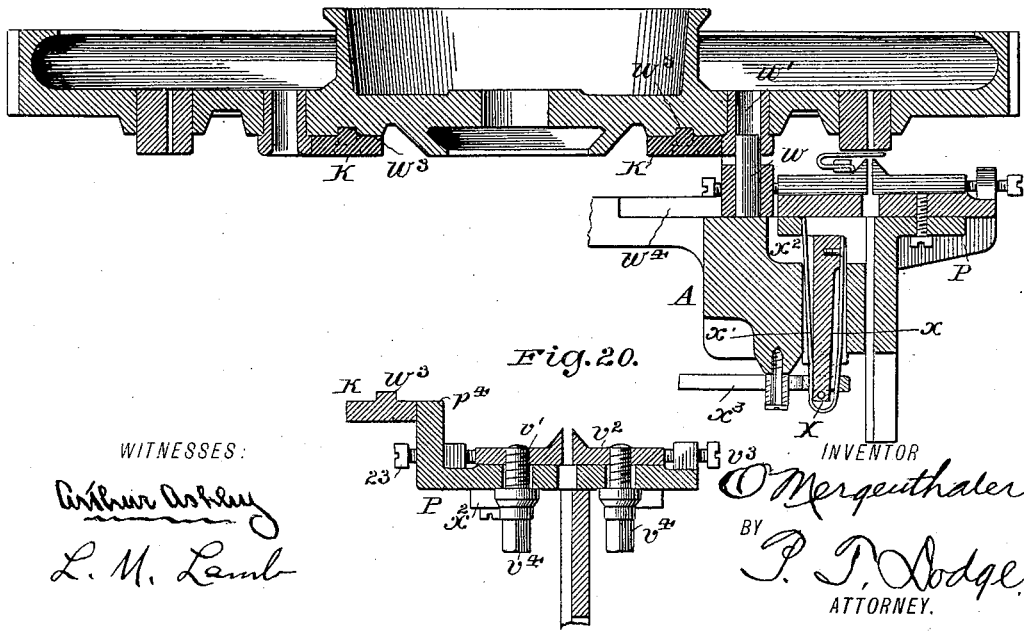
Figure 20:
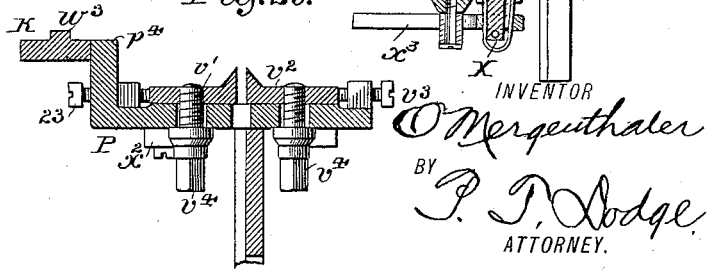

In the drawings, Figure 1 represents, in front elevation, the vise and vise-frame of a Mergenthaler linotype-machine, together with the mechanism for operating the same, and illustrates the application of the improved justifying devices thereto. Fig. 1$^a$ is an inside face view of the vise-frame, showing particularly the justifying mechanism, the trimming-knives, and the jaws to confine the matrix-line. Fig. 1$^b$ is a plan view of the upper guides for the space-shovers carried by the vise-frame. Fig. 1$^c$ is an end view of the guide carried by the vise-frame to support the lower ends of the shovers and their operating-slide. Fig. 1$^d$ is a face view of the same. Fig. 2 represents a side elevation thereof, partly in section, viewed from the left of Fig. 1. Fig. 3 represents, on a somewhat larger scale, a side elevation of the frame alone viewed from the right of Fig. 1. Fig. 4 represents in perspective the justifying devices and their operating mechanism in their relation to the vise containing a composed line and immediately prior to the beginning of the justification. Fig. 5 represents in perspective the vise containing a composed line and illustrates the mode of operation of the executor. Fig. 6 represents in front and side elevation an enlarged view of the improved space-bar. Fig. 7 represents the location of the shoving devices with respect to the composed line before justification commences. Fig. 7$^a$ represents the corresponding position of the arresting-pawl with respect to the shoving devices. Fig. 8 represents the location of the shoving devices with respect to the composed line when the first shover has advanced its space-bars into the line and the second has partly entered its space-bar. Fig. 8$^a$ represents the position of the arresting-pawl immediately after the line has thus been closed out. Fig. 8$^b$ represents the position occupied in the line by the partly-entered space-step at this stage of the operation. Figs. 9, 9$^a$, and 9$^b$ represent similar views, respectively, after the complete entry of the partly-entered space-step. Fig. 10 represents the same parts after the entered space-steps have been advanced to their final positions in the line by the executor. Fig. 11 represents the same parts at the termination of one complete movement of the first shoving device during the justifying operation and shows the adjuncts for permitting each shoving device to advance to their final positions the space-steps introduced by the preceding shoving device. Fig. 12 represents the same parts at the termination of a complete movement of the second shoving device and illustrates the manner in which said second shoving device advances to their final positions in the line the space-steps introduced by the first. Fig. 13 represents, partly broken away, the upper portion of the first shoving device. Fig. 14 represents a like view of succeeding shoving devices. Fig. 15 represents, in vertical section, the melting-pot, mold, disk, elevator, and executor, and illustrates particularly the mode of operation of the latter; Fig. 16, a modified form of the justifying devices in their application to a composed line. Fig. 17 represents a front elevation of the improved mold-disk carrying two molds and means for adjusting the trimming-knives with relation to the molds. Fig. 18 represents a central horizontal section thereof and of the coöperating knife-block mounted in the vise-frame, the customary knife-wiper, foreign to the present invention, being also shown between the knives and the mold. Fig. 19 represents a front elevation of a portion of the vise-frame and of the knife-block in place therein. Fig. 20 represents a horizontal section of the knife-block on the line 20 20 of Fig. 19, showing also the alining device of the mold-wheel by which the knives are adjusted automatically in proper relation to the mold. Fig. 21 represents a front elevation of the knife-block. Fig. 22 represents a side elevation of one of the removable molds, and Figs. 23 and 24 represent a plan and an end view of an aliner.

Similar letters of reference indicate similar parts throughout the several views.

Before entering upon a detailed explanation of the drawings I desire to say at the outset that the improvements in justification herein described are applicable generally to machines wherein composed lines of type or of type-matrices are to be justified, and that the improvements in the mold and its appurtenances are generally applicable to machines for casting metal slugs or linotypes. I do not wish, therefore, to be understood as limiting myself to their embodiment in any particular machine, although for the purpose of making clear to those skilled in the art the principles of operation upon which they are based I have shown them in their appropriate relation to a Mergenthaler linotype-machine of the character shown in Letters Patent of the United States granted to me, No. 436,532, to which reference can be had for a description of the construction and mode of operation of the contributing parts with which those herein shown would constitute or make up a complete linotype-machine. Thus, as shown in said patent, the matrices and space-bars, properly assorted and contained in suitable magazines, are released therefrom by means of finger-keys actuated by the operator to compose an entire line, and the line thus composed and assembled is shifted laterally to an elevator which lowers it in front of a mold whose form and dimensions correspond to that of the desired linotype. A clamping device, commonly called a "vise," acts upon the composed line of matrices and space-bars while in front of the mold, and the space-bars are advanced through the line, so as to justify it. A melting-pot containing constantly a large body of molten metal is arranged to close the mold on the rear side, and at the proper moment a pump in this pot acts to deliver the molten metal into the mold, where it solidifies and produces a linotype, which has formed on its edge the impression of the matrices at the front. As soon as this casting operation is completed the clamps lift the matrices from the front and the space-bars are then separated mechanically from the matrices and return to the magazine from which they started, while the matrices are carried to a distributing mechanism at the top of the machine, where they are assorted and returned to the upper ends of the appropriate magazine-channels. After the removal of the matrices therefrom the mold makes a partial revolution and an ejecting device delivers the linotype therefrom to a galley or receiver. These elements of a complete linotype-machine are so well known and their operation so well understood that it is sufficient to explain that the present improvements relate to a justification mechanism particularly suitable in such a machine, although adapted for use generally wherever line-justification is required, while the improvements in the mold devices, while also particularly appropriate to such a machine, are generally applicable wherever in like linotype or slug-casting operations it is desirable to quickly shift from one font to another.

Referring to the drawings, Figs. 1, 2, 3, and 4, A indicates the lower front part of the main frame, commonly known as the "vise-frame," provided at its top with the two longitudinally-movable jaws $a$ and $a'$, between which the composed line of matrices and spaces is confined in front of the mold. The jaw $a$, which may be moved forward to cover the mold, as hereinafter explained, stands normally and during the casting action against a rigid stop-screw or equivalent support, as clearly shown in Figs. 1 and 16, so that it is firmly supported and prevented from sliding backward during the justifying action. The opposing jaw $a'$ is allowed a slight forward and backward motion, and receives this motion, as is plainly indicated in Figs. 1, 2, and 4, from the large operating-cam B, acting on the lever $b$, fulcrumed to the main frame at $c$ and drawn backward by the spring $d$, attached to a fixed support on the main frame.

The lever $b$ (see particularly Fig. 4) is connected by rod $b'$ and crank $b^2$ to an eccentric-pin $b^3$, journaled in the vice-frame and passing through a circular opening in the end of a rod $b^4$, the opposite end of which is turned upward and provided with a screw-bearing against the back of the jaw $a'$ to give it support. By means of these connections, the cam B being properly shaped and timed, the vise-jaw $a'$ is actuated to clamp and unclamp the composed line. The jaw $a$ may stand permanently in its open position, as indicated in Figs. 1, 4, and 16, but it is preferred to have it slide forward toward its companion after the casting of each line, in order to close the front of the mold and prevent the leakage of metal therefrom in the event of the other parts failing to properly present the entire line of matrices between the jaws. To effect the automatic opening and closing of the jaw $a$ for the purpose named, it is provided with a rod $c'$, extending through a frictional spring-slide $c^2$, detachably pivoted to the vibrating arm $c^3$, which is loosely mounted on the rocking delivery-lever shaft $c^4$. The arm is provided with projections $c^5$ and $c^6$ on opposite sides of the pin $c^7$, projecting from the rock-shaft, so that as the shaft is moved to and fro its projection acts to vibrate the arm $c^3$ and thereby open and close the jaw $a$. The frictional connection between the arm $c^3$ and the jaw-operating rod $c'$ permits either to be moved independently of the other to a limited extent, as is required in practice. As shown in Figs. 1 and 2, the vertical space-shoving devices $e$, $e'$, and $e^2$ are mounted between horizontal cross-bars $x^{10}$ $x^{11}$, attached to or forming a part of the vise-frame, as plainly shown in Figs. 1, 1$^a$, 1$^b$, 1$^c$, 1$^d$, and 2. At the bottom of the vise-frame there is a horizontal guideway $f$, in which the horizontal reciprocating slide $f'$ is arranged to move.

It will be observed that the shovers $e$ $e'$ $e^2$, Fig. 4, normally rest upon the upper flat surface of a toothed rack $f^2$, attached to and forming a part of the slide, and that the slide is provided with a series of graduated steps $g$ $g'$ $g^2$ $g^3$, having sloping ends and level top surfaces, the latter being of a length sufficient to accommodate all three of the shovers, the shovers themselves being provided at their lower ends with sloping inclines corresponding to the incline of the slide-steps, in order that the steps of the slide may be advanced easily thereunder. The rack $f^2$ is operated by means of the rack-pinion $f^3$, secured to a revoluble stud-shaft $f^4$, supported vertically in loose bearings and operated by means of a sprocket-wheel $f^5$, fixed upon it and engaging with a sprocket-chain $f^6$. A cover $f^{11}$ may serve to extend over and protect the parts below. This cover, as shown in Figs. 2 and 4, is simply a slightly-curved cast-iron plate fixed in position above the sprocket chain and wheel, and its function is to prevent parts from falling upon or becoming entangled with the chain. The one end of the sprocket-chain is connected to the spring $f^7$, whose opposite end is fixed to a fixed portion of the machine, as indicated at $f^8$ in Fig. 4. The other end of the sprocket-chain $f^6$ is connected to the free end of a lever $f^9$, fulcrumed to turn freely upon a supporting-rod $f^{10}$, and adapted to be operated, as shown, by means of the cam D.

The shovers $e$ $e'$ $e^2$ are guided to move vertically and occupy a position in line with and immediately below the composed line of matrices and space-bars as the latter are delivered by the elevator to the clamping devices. The shover $e^2$ carries at its lower end, as shown in Figs. 1, 1$^a$, and 2, a cross-piece $b^7$, which bears against the vertical surface of the frame, straddling the vertical slot therein, and forming a support or bearing for the lower end of the shover, which would otherwise be liable to spring laterally into the slot through which the slide $f'$ passes.

The matrices $h$, as clearly shown in Fig. 15, are of the usual kind and shape shown in the Mergenthaler patent hereinbefore referred to, and the composed line as a whole is delivered in front of the mold in the usual manner by means of the elevator $h'$.

The construction of the space-bars is shown particularly in Fig. 6. It consists of an elongated stepped bar having the usual shoulders $l$ for engagement with the elevator and having at its upper end shoulders $l'$ for engagement with the executor, said latter shoulders being inclined upon their upper surface for a purpose hereinafter to be described.

Each side of the space-bars present a continuous surface of sheet metal $n$, preferably obtained by bending a strip of sheet metal upon itself, as indicated in Fig. 6, so that both sides of the space-bar will consist of the same integral piece of sheet metal. Within the outer layer $n$ of the space-bar is inserted a second similarly-bent piece of sheet metal $s'$, the combined thickness of the pieces $n$ and $s'$ forming the uppermost step of the space-bar. In like manner a third bent strip of sheet metal $s^2$ is inserted within the folds of the bent strip $s'$, the combined thickness of the strips $n$, $s'$, and $s^2$ constituting the next succeeding step of the space-bar. Bent strips $s^3$ and $s^4$, similarly inserted, go to make up the third and fourth steps of the space-bar. The bent strips $n$, $s'$, $s^2$, $s^3$, and $s^4$ are all continued down to the lower end of the space-bar, and rivets $s^5$ serve to unite the combined strips into a single structure, presenting a series of steps equal in length and having practically parallel sides, the steps presenting a slight incline or tapering shoulder, however, at their junction, as shown in Fig. 6 and as indicated on exaggerated scale in some of the other figures. The number of thicknesses of thin metal of which the space-bars are thus composed imparts to them a certain degree of compressibility and elasticity, which is made available, as will hereinafter more fully appear, in the justifying operation. Care is taken that the rivets shall hold the thin sheets or plates sufficiently close together to prevent the passage of the molten type-metal between the joints during the casting operation, whatever compressive action may be exerted at the time upon the sides of the space-bar. The inherent elasticity of the space-bars, on the other hand, permits them either to be very tightly compressed in the line and to so remain during the casting operation, or, after having been compressed, to partly or nearly return to their original dimensions and thus fill out the line when the compressive force is removed without opening sufficiently to admit the passage of molten type-metal between their joints. The construction, moreover, is substantial and cheap in point of manufacture. Where the usual wedge space-bars are employed without due regard to the keeping of the surfaces clean, much annoyance is occasioned by the adherence of type-metal to the space-bars. This adherence of the metal, familiarly called "galling," seems to be due to the fact that in wedge-spacing the casting is always made against the same spot on the stationary part of the wedge. It is disastrous to the matrices for the reason that when the justifying-wedges are exerting their force of closing out the line sufficiently tight to prevent metal from flowing in between the space-bars and matrices these adhesions of type-metal ruin the matrices by crushing in the thinner side walls of their die portions. This difficulty is largely avoided in the new construction because of the fact that both sides of the space-bars are movable and because in the method of justification practiced herein the space-bars are shifted so that they are cast against in more than one position.

It will be understood, as hereinbefore indicated, that the composed line, made up of matrices and space-bars, is delivered in the usual manner from the elevator to the clamping devices or vise-jaws in such manner that the shoulders $l$ are on a level with the corresponding shoulders of the matrices, as indicated in Figs. 4 and 7. In this position the upper portion or thinnest step of the space-bars is included in the line, and the lower ends of all the space-bars are in the same horizontal plane and immediately above the shovers $e\ e'\ e^2$. The upper ends of the shovers are stepped, as shown, the total distance from the summit of the first step to the base of the lowermost step being equal to the length of a step of the space-bars, and the width of each of the steps of the shovers being equal to or less than the thickness of the lower end of a space-bar. It thus becomes impossible for any step of a shover to advance more than one space-bar, and consequently as the shovers are raised one after the other it becomes impossible for more than one space-bar step to be entered into the line at a time. It will be observed (see Figs. 4, 11, 12, and 13) that the shover $e$ is provided with a shoulder projection or cheek-piece $p$, extending across the face of the shovers $e'\ e^2$, and that the shover $e'$ is provided with a similar cheek-piece $p'$, extending across the face of the shover $e$, and that the shover $e^2$ is provided with a similar cheek-piece $p^2$, extending across the face of the shover $e'$. The functions of these cheek-pieces will be hereinafter explained.

On one of their faces the shovers $e\ e'\ e^2$ are provided (see Figs. 1, 2, and 4) with a series of ratchet-teeth $n'$, with which are adapted to coöperate the swinging pawls $n^2$ or their equivalents, mounted upon a cross-rod $n^3$ and normally pressed toward the shovers by means of a spring-seated pin $n^4$. A detent-lever $n^5$, provided with a pin $n^6$ and mounted upon a rock-shaft $n^7$, is adapted to be operated to release the pawls of the rack-teeth by means of a detent-collar $n^8$ upon the rod $b'$, said detent being adapted to strike the free end of an arm $n^9$, mounted upon the rock-shaft $n^7$.

Commencing now with the location of parts indicated in Figs. 4 and 7, the method of justification prior to the action of the executor will be readily understood. In the adjustment supposed, the elevator has already been lowered to place the composed line between the vise-jaws, and the vise-jaws have been closed to a fixed distance, representing the desired length of linotype. Supposing now the line to be too short, the justification thereof now begins. As will be seen by reference to Fig. 4, wherein the arrow denotes the direction of rotation of the cams B and D, fixed upon the power-shaft, the cam B permits the spring $d$ to operate the lever $b$ at a period just prior to that at which the cam D permits the spring $f^7$ to come into action. As a consequence of this arrangement, the eccentric-pin $b^3$ closes the vise-jaw, and the detent $n^5$ throws the pawls $n^2$ out of engagement with the shovers before the slide $f'$ is actuated. Immediately thereafter, however, the slide $f'$ is caused to move toward the right with respect to Figs. 7, 8, 9, and 10, the pawls being in the position indicated in Fig. 7ª. As a consequence the slide raises, say, the first shover $e$ and a portion of the second shover $e'$, it being assumed in this case that the amount of space necessary to be introduced into the line is equal to the increased thickness of two steps and a fraction thereof of the space-bars. In such case the first shover $e$ will, in the composed line shown in Figs. 7 to 10, introduce successively into the line the first thickened step of two space-bars. There is not sufficient space, however, for the admission into the line of a step of the space-bar acted upon by the shover $e'$, and for this reason the shoulder or incline between the first step of the space-bar and the second step thereof is arrested by the lower ends of the matrices $h$, as indicated in Fig. 8$^b$. It being impossible for the space-bars to rise farther while the vise-jaws continue to be clamped, the spring $f^7$ ceases to exert any effective action for the time being. As the cams continue to revolve, however, the cam B acts upon the lever $b$ in such manner as to rock the shaft $n^7$ in the opposite direction, thereby permitting the pawls $n^2$ to move into engagement with the teeth $n'$ on the shovers $e \; e^2$. With respect to the shover $e'$, however, the lower end of the pawls occupy a position intermediate between two rack-teeth, as indicated in Fig. 8$^a$. Therefore, while the slide $f'$ is prevented from raising the shovers $e \; e^2$ because it presents no lifting-surface thereto, it can still raise the shover $e'$ to a distance represented by, say, one-half of a ratchet-tooth. At the same time the vise-jaws have been opened and the slide is therefore enabled to raise the shover $e'$ a distance equal to, say, one-half a ratchet-tooth, which will be just sufficient to introduce the partly-entered step of the space-bar into the line, as indicated in Fig. 9$^b$, and the shover $e'$ is thereupon prevented from rising further because it meets and engages with the pawls $n^2$, as indicated for one of said pawls in Fig. 9$^a$. As indicated in Fig. 9, we now have entered into the line the second step of three space-bars, the first two of said steps having been introduced successively and the third step having been first partially entered and then fully entered. It will be observed, however, that while these steps are entered in the line they have not been sufficiently advanced to close the mold. This may be effected by the executor, but for reasons hereinbefore set forth I prefer to leave as little for the executor to do as possible. For this reason I make use of the function of the cheek-pieces $p \; p' \; p^2$, and in order to make clear their function without confusion I have illustrated their action separately in Figs. 10, 11, and 12. Thus in said Figs. 10, 11, and 12 I have supposed the justification necessary to fill out the line to involve the raising of shover $e'$ to the same height as shover $e$. It will be evident that, on a comparison of the two figures, this advance of shover $e'$ will permit the cheek-piece $p'$ to advance into the line all of the space-steps already partly advanced by the shover $e$, so that the executor, in such instance, will have to take care of but one space-bar, to wit, the partly-advanced space-bar above the shover $e'$. In like manner a corresponding upward movement of the shover $e^2$ would cause its cheek-piece $p^2$ to advance into the line any partly-advanced space-steps above the shover $e'$, and similarly an additional advance of the shover $e$ would enable its cheek-piece $p$ to advance into the line any partly-advanced steps above the shover $e^2$, so that in any case the executor would only have to take care of such partly-advanced space-bars as were above some one particular shover.

The executor, as has been indicated, has for its object to advance the partly-advanced space-steps so far into the line that they will, in conjunction with the matrices, close the mold-opening, which is of course essential to the casting of a linotype. It may conveniently consist (see Figs. 4, 5, and 15) of a swinging leaf or plate M, having ears $m$, whereby it is suspended to swing from pins $m'$ at the outer ends of cross-arms $m^2$, which themselves are mounted to rock upon a pin $m^4$, fixed in the bearings on the main frame. The opposite ends of the cross-bars $m^2$ are connected by a cross-rod $m^5$, and a spring $m^6$ is interposed between this cross-rod $m^5$ and the rocking lever $m^7$, whose lower end is in the path of movement of a projection $m^8$ upon the oscillating melting-pot G, the arrangement being such that when the oscillating melting-pot swings forward upon its standard $x$ the projection $m^8$ will strike the lower end of the lever $m^7$, thereby exerting a yielding pressure, through the intermediacy of the spring $m^6$, upon the cross-rod $m^5$, which spring-pressure will rock the arms $m^2$ and raise the swinging executor-leaf M. The swinging executor-leaf M is normally urged outward by means of a spring-seated pin $m^9$. (See Fig. 15.) It will be observed that the leaf M is provided with a number of cross-ridges angular in cross-section, and that its lower end has a downward inclination corresponding to the inclination of the lug $l'$ of the elongated space-bar. It will be apparent from Fig. 15 that when the plate $m$ is in the lowermost position (indicated in dotted lines) the lugs $l'$ of such space-bars as are forced upward by the shovers will not be prevented from rising by the spring-leaf, whereas on the upward movement of the executor its lowermost ridge will raise with it such of the space-bars as have been partly advanced through a portion of a second step and will complete the admission of said partly-entered space-steps into the line sufficiently far to close the mold-opening. If a third step of a space-bar has been partly advanced into the line, the next higher ridge of the executor-leaf M will engage with the lugs of said space-bar, and thereby complete the advance of the partly-admitted third space-step into the line, and so on. It will be understood that the limit of the upward movement of the leaf M is a distance equal to the length of one of the space-steps in order to insure just sufficient advance of the space-steps to fully close out the line and to permit the steps to be advanced by the executor to the same position as those that have been fully advanced by the cheek-pieces $p \; p' \; p^2$ of the shovers.

In Fig. 10 the third space-bar has been advanced by the action of the executor acting in the manner described after the shovers have completed their work and while $e'$ is held against further upward movement by means of the pawls $n^2$. During the operation of the executor the vise-jaws remain unclamped, and when the executor action is finished the elevator containing the line of matrices is slightly lifted in the usual manner to complete the alinement of the matrices against the mold, after which the vise-jaw $a'$ closes, compressing the line to its proper length.

It will be understood that after the line has been justified and after the executor has acted and the line has been again clamped, as described, the melting-pot is closed to cast the slug or linotype, and the succeeding operations of intermittingly rotating the mold-disk, expelling the linotype into the collecting-galley, and redistributing the matrices and space-bars are proceeded with in the usual manner.

While I prefer to employ a number of shovers having a multiple series of steps, as shown, for instance, in the shovers $e$ $e'$ $e^2$, yet I may in some instances employ a series of individual shovers independent of each other and arranged side by side, as indicated in Fig. 16, wherein the individual shovers $e^4$ are each of a width equal to or narrower than the lower end of the space-bars and rest upon the inclined surfaces of the steps of the slide $v$. In the arrangement shown in this figure, moreover, the slide, which is operated in the same manner as the slide $f'$ of the arrangement first described, is provided with ratchet-teeth on its lower edge adapted to engage with pawls $z^3$, adapted to be thrown into engagement with the rack by the pins $z^4$, when permitted so to do by the detent-lever $z^5$, but held out of engagement therewith when the detent-collar $n^8$ acts upon the outer or free end of the detent-lever. The detent-collar $n^8$ is fixed upon the rod $b'$, as in the first form of the invention, and is operated by the vise-closing lever $b$ and cam B in like manner to the similar action of the same parts in the construction hereinbefore described. It will of course be noted that in this case the pawls act directly upon the slide instead of upon the teeth of the shovers, but the result attained is the same in both cases.

The mode of operation of the modification shown in Fig. 16 will be apparent from the description of the mode of operation of the preferred form of the invention. Thus a movement of the slide $v$ to the right will successively introduce into the line such of the space-bars as are encountered by the individual shovers $e^4$ in their upward movement, and space-steps will thus be successively introduced until the line is filled or until a final space-step has been partly introduced and its entering shoulder wedged in the line in manner similar to what has already been described with reference to Fig. 8$^b$. The line being thus closed out, the pawls $z^3$ are thrown into engagement with the detent-rack on the bottom of the slide $v$, the vise-jaw $a'$ is opened to unclamp the line and thereby to admit the remaining fraction of the partly-admitted space-step, and the executor is brought into action to draw all of the space-bars to their final positions within the line.

The main characteristic feature of the improvements illustrated in Figs. 17 to 24 is that by reason of the construction therein shown the planing-knives of the vise-frame are necessarily brought into exact alinement with the two molds of different sizes mounted in opposite sides of the mold-disk through the agency of aliners fastened to and carried by the mold-disk and bearing a constant relation of parallelism to the mold, it being therefore immaterial to the obtaining of perfect alinement on the rotary reversal of the mold-disk and on changing from one font to another whether the two molds on the disk be parallel to each other or not or whether they be located at exactly equal distances from the so-called "locating-holes" in the mold-disk which coöperate with the corresponding locating-pins of the vise-frame. In the drawings, H indicates the mold-disk, (seen also in Fig. 15,) and A the vise-frame, having, respectively, the locating-holes W' and locating-pins W familiar in this class of machines. The mold-disk, as shown in Fig. 17, is provided with diagonal grooves $W^2$, parallel to each other, and within each of which is adapted to engage a guide-rib $W^3$, formed diagonally on the rear surface of an aliner-bar K, as shown in full lines in Figs. 18, 19, 23, and 24 and in dotted lines in the upper half of Fig. 17. Each aliner presents its outer edge in a line parallel with the adjacent mold. As, however, the rib on the back of the aliner is in a diagonal position, a movement of the aliner endwise will have the effect of moving its edge toward or from the mold, in order that it may properly adjust and support the slug-trimming knife in relation to the mold, as hereinafter explained. Set-screws $W^5$, Fig. 19, are extended through open slots in the opposite ends of the aliner and into the mold-disk and serve to lock the aliner in the adjustment chosen for it in any particular case. Each aliner is thus adjustable as to distance from the mold, but in any position of adjustment will retain a constant and true parallel therewith.

The knife-block (which is shown separately in Figs. 20 and 21) is provided with the two planing-knives $v'$ $v^2$, adjustable from or toward each other by means of the adjusting-screws $v^3$, supported in the knife-block frame P and adapted to be locked in the position of adjustment chosen by means of the locking-screws $v^4$, which pass through screw-threaded apertures $v^5$ in the knives and through elongated slots in the knife block frame P. Facility is thus afforded for setting the knives to the desired gage or distance apart appropriate to the particular font employed.

The knife-block is adapted to slide loosely into the frame from the left into horizontal grooves $W^4$, as shown by dotted lines in Figs. 1$^a$ and 19. It is held loosely in position by the end of a spring $x'$, projecting from a horizontal rotating plug $x$, seated in the main frame. The knife-block has a projection $x^2$. After the block is in place the rotation of the plug causes the end of the spring to sweep over and against the inner edge of the projection $x^2$, as plainly shown in Fig. 18, so that the end of the spring tends to press the knife-block inward to the left and to hold it against the adjacent aliner K, which serves to determine the position of the block and to keep its knives in alinement with the mold. By rotating the block to the left the end of its spring is turned upward and outward over the top of the projection $x^2$ on the knife-block, thus allowing the block to be removed to the right. The plug $x$ is provided with a handle $x^3$, as shown, for giving this rotation. It will be understood that the function of the spring $x'$ is simply to hold the knife-block from sliding out of the frame accidentally and to hold it with a yielding pressure against the aliner, so that the latter may determine the position of the knives with relation to the mold. The construction is therefore adapted to permit of the ready removal of one knife-block from the vise-frame and the substitution therefor of another knife-block whose planing-knives have already been adjusted to a different font, this substitution being possible in a very short space of time and with great facility.

It will be noted that the knife-block is provided with overhanging ledges $p^4$ and that these ledges bear against the outer vertical edge of the aliner as the mold-disk is caused to approach the vise-frame. Consequently the knife-block and its planing-knives, which stand vertically, are brought into accurate alinement with the mold, it being remembered that the mold and aliner bear a constant relation of parallelism to each other. Any wear to which the locating-pins on the vise or the locating-holes on the mold-disk have been subjected is therefore without prejudicial effect upon the proper alinement of the planing-knives, and the knives will, therefore, always assume the position of the mold and will stand exactly in front of and in alinement with the mold-opening even though the molds may not be parallel to each other or at equal distances from the locating-holes. For the convenient insertion and removal of the molds from the mold-disks we may, as shown in Figs. 17 and 22, provide the molds with shoulders $r$, adapted to engage beneath the heads $r'$ of the screws R, which are seated in the mold-disk and cut away on one side, whereby a partial rotation of the screws in one direction will release the molds and permit their removal, and a partial rotation of the screws in the opposite direction will lock in place the new molds to be inserted.

Referring once more to the justifying devices, I desire to point out the characteristic feature that, during justification, the vise-jaws, instead of holding the composed line by spring-pressure, are held apart or spaced at a fixed distance and are not closed until after justification is completed, at which time the lever $c^3$, Fig. 1, acts to close them, so as to prevent metal from entering between the joints should the line have been insufficiently filled.

While I have described herein the use of stepped spaces which are laminated, and which consequently possess marked compressibility, it is found in practice that solid spaces of like form may be used to good advantage provided the rise of their steps or shoulders is kept within reasonable limits, the elasticity of the matrix-line being alone sufficient to compensate for the extremely small variations and permit practically exact justification.

In practice it is found that a machine constructed on my plan gives lines of, say, nearly uniform length, that the variation cannot be detected by the eye, that a large proportion of the lines are of the exact length determined upon, and that in an equally large proportion of the lines the spaces are of equal width.

In various pending applications of earlier date than the present I have presented and claimed different arrangements of mechanism for adjusting stepped spaces to effect justification. The present mechanism is distinguished from the others by certain notable features, among which are the shovers, each with a plurality of steps formed thereon, the projections overlapping from one shover to the next and acting on the spaces, and a stepped device to advance the stepped pushers.

The idea of providing vise-jaws without normal tendency to close during justification is, broadly considered, the subject-matter of my earlier application for patent, Serial No. 481,339.

By the expression "a stepped pusher," as herein employed, is meant a pusher having a plurality of steps to advance spaces to different positions in the line.

I do not claim herein, broadly, all mechanisms for advancing stepped spaces into a line predetermined distances, the same being the subject-matter of claims in my application for patent Serial No. 327,079. I do not claim herein, broadly, shovers advanced successively by shoulders or projections extending from one shover to another, this being broadly claimed in my application for patent Serial No. 481,854. Neither do I claim herein, broadly, all means for forcing the partly-entered step of a space fully into the line; nor all means for separating the jaws to permit the entrance of the last step and thereafter closing the jaws to their final position; nor all pawl-and-ratchet mechanism for limiting the advance of the spaces through the line while the jaws are separated; nor, broadly, an executor to finally engage the partly-entered spaces and complete their entrance into the line, all of the aforesaid features being a portion of the subject-matter of my application for patent Serial No. 481,339.

Having thus described my invention, what I claim is—

1. In a justifying mechanism and in combination with a composed line of matrices and stepped spaces therein, a shoving device provided with steps adapted to advance the space-bars successively.

2. In a justifying mechanism and in combination with a composed line of matrices and stepped spaces therein, a stepped shoving device adapted to advance the space-bars successively, the length of one of the steps on the space-bar being equal to the distance of the highest step on the shoving device above the base of the lowest step thereon.

3. In a justifying mechanism and in combination with a composed line of matrices and stepped spaces therein, a plurality of separate stepped pushers provided respectively with shoulders or projections overlapping from one shover to the next, for completing the advance into the line of steps entered but not yet advanced to their final positions in the line.

4. In a justifying mechanism, and in combination with a composed line of matrices and stepped spaces therein, a stepped shoving device to advance the space-bars successively and a stepped slide to act upon the shoving device.

5. In a justifying mechanism and in combination with a composed line of matrices and stepped spaces therein, a stepped shoving device to advance the space-bars successively, and a stepped slide to act on the shoving device, the height of the steps on the slide being equal to the length of the steps on the spaces.

6. In a justifying mechanism and in combination with a composed line of matrices and stepped spaces therein, a series of independently-movable stepped shovers, and a stepped slide arranged to act on the series of shovers substantially as described.

7. In a justifying mechanism and in combination with a composed line of matrices and stepped spaces therein, a shoving device having steps to advance the spaces successively, means for advancing the shoving device, and means for checking its advance when the line is released endwise.

8. In a justifying mechanism and in combination with a composed line of matrices and stepped spaces therein, a shoving device having steps adapted to advance the spaces successively, means for advancing the shoving device, and a pawl-and-ratchet mechanism to limit its advance when the line is released.

9. In a justifying mechanism and in combination with a composed line of matrices and stepped spaces therein, a separate shoving device comprising a number of separate pushers or shovers provided with ratchet-teeth, and pawl devices coöperating with said ratchet-teeth to limit the advance of the pushers.

10. In a justifying mechanism and in combination with a composed line of matrices and stepped spaces therein, a stepped shoving device comprising a number of separate stepped shovers with ratchet-teeth thereon, a pawl mechanism coöperating with said ratchet-teeth, a lever for disengaging the pawls, and a time-cam for operating said disengaging device, at the same time that the clamping-jaws of the line are closed.

11. In a justifying mechanism and in combination with a composed line of matrices and stepped spaces therein, a space shoving or adjusting mechanism comprising a number of separate stepped pushers or shovers arranged in line, means for advancing the shovers, a pawl-and-ratchet mechanism for limiting their advance when the line is released, and means for throwing the pawl-and-ratchet mechanism out of engagement when the line is clamped.

12. In a justifying mechanism and in combination with a composed line of matrices and stepped spaces therein, a shoving device having steps thereon, means for advancing the shoving device when the line is clamped endwise, means for arresting the further advance of the shoving device while the line is released, an executor for bringing to their final positions in the line the steps partly entered by the shoving device, and means for subsequently compressing the line to the required length.

13. In a justifying mechanism and in combination with a composed line of matrices and stepped spaces therein, a stepped shoving device, a stepped slide, and means for advancing and retreating the slide.

14. In a justifying mechanism and in combination with a composed line of matrices and stepped spaces therein, a stepped shoving device, a stepped slide to advance the same, means for constantly pressing the slide in one direction, and a cam acting in opposition to said means.

15. In a justifying mechanism and in combination with a composed line of matrices and spaces therein, a stepped shoving device, a stepped slide for advancing the same, a spring-actuated gearing for actuating the slide, and a cam operating in opposition to the spring.

16. In a justifying mechanism and in combination with a composed line of matrices and stepped spaces therein, a stepped shoving device, and a stepped slide for operating the same, the lower end of the shoving device and the edges of the slide-steps being correspondingly inclined.

17. In a justifying mechanism and in combination with a composed line of matrices and stepped spaces therein, a shoving device, a stepped slide for actuating the same, a rack on the slide, a pinion engaging the rack, a sprocket-wheel on the pinion-shaft, a sprocket-chain, a spring connected with and tending to move the chain, an oscillating lever connected to the opposite end of the chain, and a cam for operating the lever.

18. In a justifying mechanism and in combination with a composed line of matrices and stepped spaces therein, the jaws to limit the length of the line, mechanism for opening and closing said jaws, the stepped pushers having ratchet-teeth, a pawl engaging said teeth to limit the advance of the spaces and pushers when the jaws are opened, and connections acting to disengage the pawl when the jaw is closed and vice versa.

19. In a justifying mechanism and in combination with stepped tooth pushers, the pawl engaging the same, the rock-shaft and its arm for disengaging the pawl, the sliding jaw, its controlling-bar $b^4$, the eccentric $b^3$, and its crank for operating said bar, and the rod connecting the eccentric-crank with the arm of the rock-shaft $n^7$.

20. In a justifying mechanism and in combination with a composed line of matrices and stepped spaces therein, in combination with a shover having therein a series of steps to advance the spaces successively in the line, and an executor substantially as shown to engage the spaces and complete the advance of the entered steps.

21. In a justifying mechanism and in combination with a composed line of matrices and stepped spaces therein, a plurality of stepped pushers each having a lip or shoulder overlapping the next, means for advancing said pushers successively, and an executor to finally engage the spaces having steps partly entered in the line to complete their entrance.

22. In a justifying mechanism and in combination with a composed line of matrices and stepped spaces therein, in combination with mechanism for advancing the spaces successively to insert but one additional step at a time into the line until the line is filled out, means for carrying some of the inserted steps to their final positions in the line simultaneously with the insertion of a subsequently-inserted step or steps, whereby the steps successively inserted into the line are in part advanced to their final position in the line, while the insertion of others is proceeding.

23. In a linotype-machine, a knife-block carrying both trimming-knives and bodily removable without disturbing the adjustment of the knives.

24. In a linotype-machine a knife-block carrying both trimming-knives and bodily removable without disturbing the adjustment of the knives, and means for locking said knife-block in place permitting its speedy release.

25. In a linotype-machine, the combination of a mold-carrying wheel, a knife-block movably mounted in the frame, and an alining-surface carried by the mold-wheel and acting on the knife-block to determine the relation of the knives to the mold.

26. In a linotype-machine, a knife-block and a spring tending to move the same in one direction, in combination with the mold-carrier acting in opposition to the spring to determine the position of the knife-support and its relation to the mold.

27. In a linotype-machine the mold-disk and the mold therein, an adjustable liner, and a movable knife-block operating with and adjusted by said liner.

28. In a linotype-machine, the mold-disk and mold therein, in combination with the alining device for the knife-block, consisting of the adjustable plate united with the disk by a sliding connection in a line diagonal to the mold, whereby the distance of the liner from the mold may be varied without destroying parallelism.

29. In a linotype-machine the sliding matrix and mold closing jaw $a$, combined with friction devices for opening and closing the same.

30. In a linotype-machine and in combination with the sliding jaw $a$, its operating-rod $c$, the vibrating arm $c^3$ and the frictional connection between said arm and rod.

31. In a linotype-machine the sliding jaw $a$, its operating-rod $c'$, the vibrating arm $c^3$, the frictional device connecting the same with the rod, and the rock-shaft $c^4$ connected with arm $c^3$ by devices allowing lost motion between them substantially as shown.

32. In a linotype-machine, the slotted mold and in combination with the inserted mold having overhanging ears at its two ends, and the retaining-screws seated in the disk and having their heads cut away on one side as shown.

In testimony whereof I affix my signature in presence of two witnesses.

OTTMAR MERGENTHALER.

Witnesses:
 THOS. M. DOBBIN,
 WILLIAM H. BERRY.